(12) United States Patent
Itano et al.

(10) Patent No.: US 12,305,109 B2
(45) Date of Patent: *May 20, 2025

(54) COMPOSITION CONTAINING REFRIGERANT, USE OF SAME, FREEZER HAVING SAME, AND METHOD FOR OPERATING SAID FREEZER

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP); Satoshi Tokuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 689 days.

This patent is subject to a terminal disclaimer.

(21) Appl. No.: 17/554,591

(22) Filed: Dec. 17, 2021

(65) Prior Publication Data

US 2022/0112416 A1    Apr. 14, 2022

Related U.S. Application Data

(63) Continuation of application No. PCT/JP2020/024122, filed on Jun. 19, 2020.

(30) Foreign Application Priority Data

Jun. 19, 2019 (JP) .................................. 2019-114157

(51) Int. Cl.
  *C09K 5/04* (2006.01)
  *F25B 41/40* (2021.01)
(52) U.S. Cl.
  CPC .............. *C09K 5/045* (2013.01); *F25B 41/40* (2021.01); *C09K 2205/122* (2013.01);
  (Continued)

(58) Field of Classification Search
  CPC .............. C09K 5/045; C09K 2205/122; C09K 2205/126; C09K 2205/22; C09K 2205/40; F25B 41/40; F25B 1/00
  See application file for complete search history.

(56) References Cited

U.S. PATENT DOCUMENTS

2014/0077123 A1  3/2014  Fukushima
2016/0333243 A1  11/2016  Fukushima et al.
(Continued)

FOREIGN PATENT DOCUMENTS

WO  2012/157765  11/2012
WO  2015/115252  8/2015
(Continued)

OTHER PUBLICATIONS

International Search Report issued Sep. 1, 2020 in International (PCT) Application No. PCT/JP2020/024122.
(Continued)

*Primary Examiner* — Andrew J. Oyer
(74) *Attorney, Agent, or Firm* — Wenderoth, Lind & Ponack, L.L.P.

(57) ABSTRACT

An object is to provide a novel low-GWP mixed refrigerant. Provided as a means for a solution is a composition comprising a refrigerant, the refrigerant comprising trans-1,2-difluoroethylene (HFO-1132(E)) and difluoromethane (R32), wherein HFO-1132(E) is present in an amount of 25 to 27 mass % based on the total of HFO-1132(E) and R32, and R32 is present in an amount of 73 to 75 mass % based on the total of HFO-1132(E) and R32.

8 Claims, 1 Drawing Sheet

(52) U.S. Cl.
CPC .... *C09K 2205/126* (2013.01); *C09K 2205/22* (2013.01); *C09K 2205/40* (2013.01)

(56) References Cited

U.S. PATENT DOCUMENTS

| | | |
|---|---|---|
| 2017/0002245 A1 | 1/2017 | Fukushima |
| 2017/0058171 A1* | 3/2017 | Fukushima ............ C09K 5/045 |
| 2017/0058173 A1 | 3/2017 | Fukushima |

FOREIGN PATENT DOCUMENTS

| | | |
|---|---|---|
| WO | 2015/141678 | 9/2015 |
| WO | 2015/186557 | 12/2015 |
| WO | 2015/186558 | 12/2015 |

OTHER PUBLICATIONS

Extended European Search Report issued Jun. 1, 2023 in corresponding European Patent Application No. 20826809.4.

\* cited by examiner

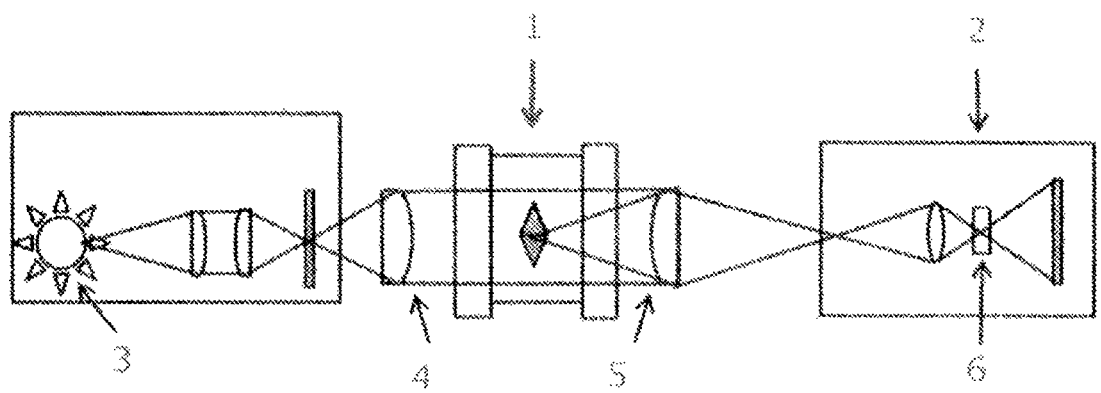

COMPOSITION CONTAINING REFRIGERANT, USE OF SAME, FREEZER HAVING SAME, AND METHOD FOR OPERATING SAID FREEZER

TECHNICAL FIELD

The present disclosure relates to a composition comprising a refrigerant, use of the composition, a refrigerating machine comprising the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: HFC-32 or R32) and pentafluoroethane ($C_2HF_5$: HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY

A composition comprising a refrigerant, the refrigerant comprising trans-1,2-difluoroethylene (HFO-1132(E)) and difluoromethane (R32), wherein HFO-1132(E) is present in an amount of 25 to 27 mass % based on the total of HFO-1132(E) and R32, and R32 is present in an amount of 73 to 75 mass % based on the total of HFO-1132(E) and R32.

Advantageous Effects

The refrigerant according to the present disclosure has a low GWP.

BRIEF DESCRIPTION OF DRAWINGS

FIG. 1 a schematic view of an apparatus used in a flammability test.

DESCRIPTION OF EMBODIMENTS

The present inventors conducted intensive studies to solve the above problem, and consequently found that a composition comprising a refrigerant, the refrigerant comprising trans-1,2-difluoroethylene (HFO-1132(E)) in an amount of 25 to 27 mass % based on the entire refrigerant and difluoromethane (R32) in an amount of 73 to 75 mass % based on the entire refrigerant, has the above properties.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises one or more other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013.

1. Refrigerant 1.1 Refrigerant Component

The refrigerant according to the present disclosure comprises trans-1,2-difluoroethylene (HFO-1132(E)) and difluoromethane (R32), wherein HFO-1132(E) is present in an amount of 25 to 27 mass % based on the total of HFO-1132 (E) and R32, and R32 is present in an amount of 73 to 75 mass % based on the total of HFO-1132(E) and R32.

The refrigerant according to the present disclosure has a COP of 100% or more and a refrigerating capacity of 100% or more relative to those of R410A, and a GWP of 500 or less, and is classified under the category of WCF lower flammability.

The refrigerant according to the present disclosure may further comprise other additional refrigerants in addition to HFO-1132(E) and R32 as long as the above properties and effects are not impaired. In this respect, the refrigerant according to the present disclosure preferably comprises HFO-1132(E) and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

1.2 Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1 Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2 Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

Specifically, the following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain a tracer in a total amount of about 10 parts per million by weight (ppm) to about 1000 ppm based on the entire refrigerant composition. The refrigerant composition according to the present disclosure may preferably contain a tracer in a total amount of about 30 ppm to about 500 ppm, and more preferably about 50 ppm to about 300 ppm, based on the entire refrigerant composition.

2.3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4 Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5 Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1 Refrigeration Oil

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, can be suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3.2 Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132(E)) and difluoromethane (R32), wherein HFO-1132(E) is present in an amount of 25 to 27 mass % based on the total of HFO-1132(E) and R32, and R32 is present in an amount of 73 to 75 mass % based on the total of HFO-1132(E) and R32.

Item 2.

The composition according to Item 1, for use as a working fluid for a refrigerating machine, wherein the composition further comprises a refrigeration oil.

Item 3.

The composition according to Item 1 or 2, for use as an alternative refrigerant for R410A.

Item 4.

Use of the composition according to Item 1 or 2 as an alternative refrigerant for R410A.

Item 5.

A refrigerating machine comprising the composition according to Item 1 or 2 as a working fluid.

Item 6.

A method for operating a refrigerating machine, comprising circulating the composition according to Item 1 or 2 as a working fluid in a refrigerating machine.

EXAMPLES

The present disclosure is described in more detail below with reference to Examples. However, the present disclosure is not limited to the Examples.

Mixed refrigerants were prepared by mixing HFO-1132 (E), R32, R1234ze, and CO$_2$ at mass % based on their sum shown in Tables 1 to 18.

The GWP of R410A (R32=50%/R125=50%) and the mixed refrigerants was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in PTL 1). The refrigerating capacity of R410A and the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity ratio of the mixed refrigerants relative to those of R410A were determined. The calculation conditions were as follows.

Evaporating temperature: 5° C.
Condensation temperature: 45° C.
Degree of superheating: 5 K
Degree of subcooling: 5 K
Compressor efficiency: 70%

Table 1 shows these values together with the GWP of each mixed refrigerant. The COP and refrigerating capacity are ratios relative to R410A.

The coefficient of performance (COP) was determined by the following formula.

COP=(refrigerating capacity or heating capacity)/power consumption

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. The propagation of flame was photographed with a schlieren system using a collimating lens and a high-speed digital video camera (frame rate: 600 fps), and recorded as video data on a PC. From the video image, flame propagation rate Sb (cm/sec) was measured. The burning velocity (Su) is expressed as the volume of unburned gas consumed by the flame surface of a unit area per unit time and was calculated by using the following formula.

$$Su = Sb * \rho u / \rho b$$

ρu: adiabatic flame temperature (unburned)
ρb: adiabatic flame temperature (burned)
ρu represents the measurement temperature, and ρb represents the combustion of combustion gas and is calculated from isobaric specific heat.

Table 1 shows the results.

TABLE 1

| Item | | Com Ex 1 | Com Ex 2 | Com Ex 3 | Example 1 | Example 2 | Example 3 | Com Ex 4 | Com Ex 5 |
|---|---|---|---|---|---|---|---|---|---|
| HFO-1132E | mass % | R410A | 0.0 | 20.0 | 25.0 | 26.0 | 27.0 | 30.0 | 50.0 |
| R32 | mass % | | 100.0 | 80.0 | 75.0 | 74.0 | 73.0 | 70.0 | 50.0 |
| GWP | — | 2088 | 675 | 540 | 507 | 500 | 493 | 473 | 338 |
| COP ratio | % (Relative to R410A) | 100 | 102.4 | 100.9 | 100.6 | 100.5 | 100.4 | 100.2 | 99.1 |
| Refrigerating Capacity ratio | % (Relative to R410A) | 100 | 112.3 | 112.6 | 112.7 | 112.7 | 112.8 | 111.9 | 98.3 |
| Condensation * Glide | K | 0.1 | 0.0 | 0.2 | 0.1 | 0.1 | 0.1 | 0.1 | 0.0 |
| Burning Velocity | cm/s | 0.0 | 6.7 | 9.0 | 9.8 | 9.9 | 10 | 10.5 | 14 |

From these results, it is understood that a mixed refrigerant comprising HFO-1132(E) and difluoromethane (R32), wherein HFO-1132(E) is present in an amount of 25 to 27 mass % based on the total of HFO-1132(E) and R32, and R32 is present in an amount of 73 to 75 mass % based on the total of HFO-1132(E) and R32, has a COP of 100% or more and a refrigerating capacity of 100% or more relative to those of R410A, and a GWP of 500 or less, and is classified under the category of WCF lower flammability.

DESCRIPTION OF THE REFERENCE NUMERALS

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132(E)) and difluoromethane (R32) in a total amount of 99.5 mass % or more based on the entire refrigerant, wherein HFO-1132(E) is present in an amount of 25 to 27 mass % based on the total of HFO-1132(E) and R32, and R32 is present in an amount of 73 to 75 mass % based on the total of HFO-1132(E) and R32.

2. The composition according to claim 1, for use as a working fluid for a refrigerating machine, wherein the composition further comprises a refrigeration oil.

3. The composition according to claim 1, for use as an alternative refrigerant for R410A.

4. A refrigerating machine comprising the composition according to claim 1 as a working fluid.

5. A method for operating a refrigerating machine, comprising circulating the composition according to claim 1 as a working fluid in a refrigerating machine.

6. The composition according to claim 2, for use as an alternative refrigerant for R410A.

7. A refrigerating machine comprising the composition according to claim 2 as a working fluid.

8. A method for operating a refrigerating machine, comprising circulating the composition according to claim 2 as a working fluid in a refrigerating machine.

\* \* \* \* \*